United States Patent
Rahmes et al.

(10) Patent No.: US 8,660,716 B1
(45) Date of Patent: Feb. 25, 2014

(54) COMPARATIVE VERTICAL SITUATION DISPLAYS

(75) Inventors: Timothy F. Rahmes, Bothell, WA (US); Peter James Batsakes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 12/772,784

(22) Filed: May 3, 2010

(51) Int. Cl.
 *G05D 1/00* (2006.01)
(52) U.S. Cl.
 USPC .................................. 701/4; 701/3; 340/970
(58) Field of Classification Search
 USPC ...................... 701/3, 4, 14; 340/951, 970, 974
 See application file for complete search history.

(56) References Cited

U.S. PATENT DOCUMENTS

| | | | |
|---|---|---|---|
| 5,519,392 A | 5/1996 | Oder et al. | |
| 6,154,151 A | 11/2000 | McElreath et al. | |
| 6,163,744 A * | 12/2000 | Onken et al. | 701/3 |
| 6,181,987 B1 * | 1/2001 | Deker et al. | 701/3 |
| 6,266,610 B1 | 7/2001 | Schultz et al. | |
| 7,603,209 B2 | 10/2009 | Dwyer et al. | |
| 2003/0004619 A1 * | 1/2003 | Carriker et al. | 701/3 |
| 2003/0222887 A1 * | 12/2003 | Wilkins et al. | 345/618 |
| 2004/0239529 A1 * | 12/2004 | Tran | 340/961 |
| 2005/0261808 A1 * | 11/2005 | Artini et al. | 701/3 |
| 2006/0004496 A1 * | 1/2006 | Tucker et al. | 701/4 |
| 2006/0250280 A1 * | 11/2006 | Chen et al. | 340/974 |
| 2007/0164877 A1 * | 7/2007 | Mumaw et al. | 340/973 |
| 2007/0208465 A1 * | 9/2007 | Gremmert | 701/4 |
| 2007/0219678 A1 * | 9/2007 | Coulmeau | 701/3 |
| 2007/0219679 A1 * | 9/2007 | Coulmeau | 701/3 |
| 2008/0262664 A1 * | 10/2008 | Schnell et al. | 701/4 |
| 2008/0300737 A1 * | 12/2008 | Sacle et al. | 701/3 |
| 2009/0150012 A1 * | 6/2009 | Agam et al. | 701/3 |
| 2009/0267800 A1 * | 10/2009 | Hammack et al. | 340/973 |
| 2010/0026525 A1 * | 2/2010 | Feyereisen et al. | 340/972 |
| 2010/0100313 A1 * | 4/2010 | Aspen | 701/208 |
| 2010/0241292 A1 * | 9/2010 | Gremmert | 701/3 |
| 2010/0250032 A1 * | 9/2010 | Gremmert | 701/9 |

\* cited by examiner

*Primary Examiner* — Helal A Algahaim
(74) *Attorney, Agent, or Firm* — Hope Baldauff, LLC

(57) ABSTRACT

Methods, systems, and computer-readable media are described herein for providing comparative vertical situation displays of multiple flight routes. According to embodiments presented herein, information regarding a currently active flight route of an aircraft and one or more proposed alternate flight routes is combined with airborne constraint data to display a comparative vertical situation display for each of the active route and/or the proposed routes. Each of the comparative vertical situation displays shows the vertical component of the corresponding flight route along with the vertical components of one or more airborne constraints along the corresponding flight route. The comparative vertical situation displays are concurrently shown on a display unit, allowing the flight crew of the aircraft or route planning personnel to compare the impact of the airborne constraints along the vertical component of each of the flight routes.

15 Claims, 4 Drawing Sheets

COMPARATIVE VERTICAL SITUATION DISPLAYS

BACKGROUND

An aircraft en-route to its destination may face numerous airborne constraints that can impact the on-time performance, fuel consumption, passenger comfort, emissions, and other factors that contribute to the cost, customer experience and safety of a flight. Such airborne constraints may include headwinds, tailwinds, turbulence, volcanic ash, convective weather, air traffic congestion, icing potential, high ice water content causing engine power loss, environmental impact constraints such as contrail formation, and the like. The flight crew of the aircraft or route planning personnel at the airline's operation center ("AOC") or an Air Navigation Service Provider ("ANSP") may analyze the affects of these airborne constraints on multiple flight routes in order to select an optimized flight route for the aircraft, thereby decreasing fuel usage, flight time, and emissions, while increasing passenger safety and comfort.

Current plan-view situation displays on aircraft, such as a plan-mode navigation display showing multiple flight routes, are only capable of showing the impact of the airborne constraints at one altitude stratum, and comparisons between flight plan routes and constraints at differing flight levels may be a high workload and cognitively demanding task. This may be especially problematic during high workload phases of flight. Further, while vertical situation displays may be available for viewing the vertical component of a flight route, these displays are generally limited to viewing the profile of the active flight plan route only, and may not show the vertical components of the airborne constraints along the route. These single vertical situation display implementations therefore present incomplete information to the flight crew or route planning personnel.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media are described herein for providing comparative vertical situation displays of multiple flight routes. According to embodiments presented herein, information regarding a currently active flight route of an aircraft and one or more proposed alternate flight routes is combined with airborne constraint data to display a comparative vertical situation display for each of the active route and/or the proposed routes. Each of the comparative vertical situation displays shows the vertical component of the corresponding flight route along with the vertical components of one or more airborne constraints along the corresponding flight route. The comparative vertical situation displays are concurrently shown on a display unit, allowing the flight crew of the aircraft or other route planning personnel to compare the impact of the airborne constraints along the vertical component of each of the flight routes.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
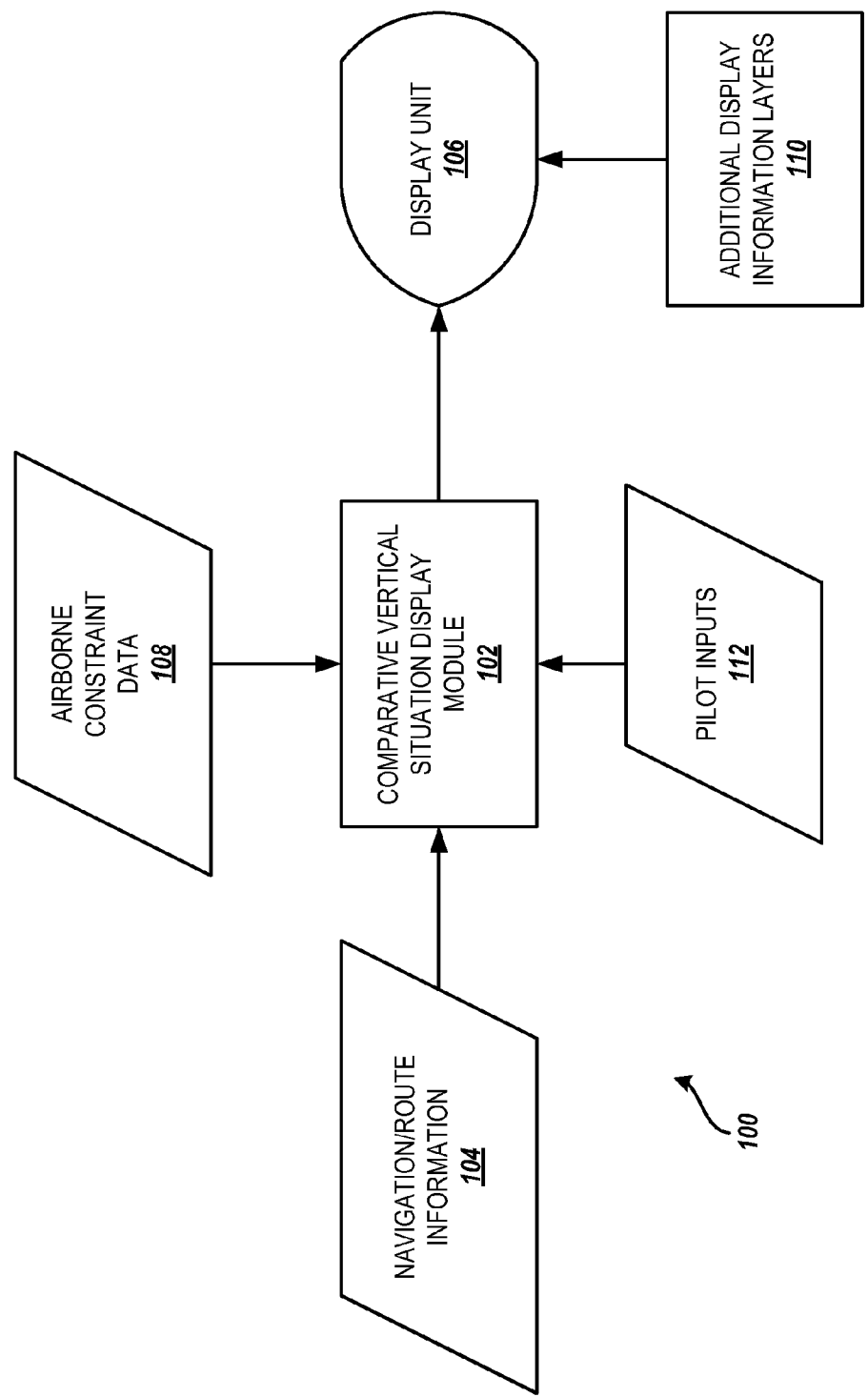
FIG. 1 is a block diagram illustrating various aspects of a route planning system of an aircraft, according to embodiments presented herein.

The following detailed description is directed to methods, systems, and computer-readable media for providing comparative vertical situation displays of multiple flight routes. Utilizing the concepts and technologies described herein, two or more vertical situation displays ("VSDs") may be displayed for multiple flight routes of an aircraft that show the vertical component of each of the routes along with airborne constraints and other contextual data that may impact the routes. Airborne constraints may include headwinds, tailwinds, turbulence, high ice water content, contrail conditions, volcanic ash, convective weather, air traffic congestion, icing potential, and the like.

The display of the comparative VSDs for the flight routes may aid the flight crew of the aircraft or route planning personnel at the airline's operation center ("AOC") or an Air Navigation Service Provider ("ANSP") in analyzing and selecting an optimized flight route for the aircraft, thereby decreasing fuel usage, flight time, and emissions, while increasing passenger safety and comfort. In addition, when displayed in conjunction with a plan-view display depicting the lateral components of the flight routes, the display of comparative VSDs for multiple flight routes may provide a low-workload method for the flight crew or controller to establish situational awareness regarding the current flight path of the aircraft, and quickly evaluate the merits of proposed, alternate flight routes. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

FIG. 1 shows various aspects of a route planning system 100 having the capability to display comparative VSDs of multiple flight routes, according to embodiments. In one embodiment, the route planning system 100 is an integrated component of a flight management system ("FMS") and/or other cockpit avionics systems of an aircraft. In other embodiments, the route planning system 100 may be implemented in a ground-based computing system of an AOC, ANSP, or air-traffic control ("ATC"). The route planning system 100 may further be implemented in an individual computing device, such as a controller's workstation, a desktop personal computer ("PC"), a laptop, a notebook, a hand-held device, and the like.

The route planning system 100 includes a comparative vertical situation display module 102. The comparative vertical situation display module 102 receives navigation/route information 104 regarding two or more currently active and/or proposed flight routes of an aircraft and displays a VSD for each of the flight routes on a display unit 106 accessible by the route planning system 100. The comparative vertical situation display module 102 may be implemented as software, hardware, or a combination of the two and may execute on one or more processors or computing devices within the route planning system 100.

The navigation/route information 104 may include details regarding a currently active flight route of the aircraft. The active flight route may be provided to the comparative vertical situation display module 102 from the FMS or other avionics system of the aircraft, for example. The navigation/route information 104 may further include alternate or proposed flight routes for the aircraft. The proposed flight routes may be supplied to the comparative vertical situation display module 102 by the flight crew of the aircraft during the flight-planning phase of a flight or while en route. The proposed flight routes may also be provided by the AOC controlling the aircraft, or may consist of a number of pre-defined routes through a particular region, such as the North Atlantic Tracks published by U.S., Canadian, and European ANSPs.

The alternate or proposed routes may exist in a database within the route planning system 100, may be data-linked from ground sources, or may be provided to the comparative vertical situation display module 102 directly through a user interface connected to the route planning system. In addition to the active and proposed flight routes, the navigation/route information 104 may contain other data regarding the flight routes or navigation of the aircraft, including navigation waypoints, divergence waypoints, convergence waypoints, point locations of known hazards, airport locations, geographic maps, topography maps, satellite maps, and the like.

The display unit 106 may be located in the cockpit of the aircraft and may be a graphical display, such as an electronic flight bag ("EFB") display, a multi-function display ("MFD"), or a heads-up display ("HUD") found in a modern "glass cockpit." Alternatively, the display unit 106 may be a computer monitor, a laptop computer display, a handheld display, or other suitable display device accessible by the route planning system 100.

The route planning system 100 also includes airborne constraint data 108 utilized by the comparative vertical situation display module 102 to display the comparative VSDs on the display unit 106. The airborne constraint data 108 may include data regarding headwinds, tailwinds, turbulence, high ice water content, contrail mitigation or avoidance, volcanic ash, convective weather, air traffic congestion, icing potential, and the like. Other airborne constraint data 108 may be imagined by one skilled in the art beyond those described herein, and it is intended that this application include all such airborne constraint data 108. According to embodiments, the comparative vertical situation display module 102 displays the airborne constraint data 108 and other contextual data in the comparative VSDs in conjunction with the vertical components of the flight routes, as will be described in more detail below in regard to FIG. 2.

The comparative vertical situation display module 102 may receive the airborne constraint data 108 from a variety of sources. For example, data regarding headwinds, tailwinds, convective weather, icing potential, and the like may be received at the aircraft via broadcast transmission from a real-time weather broadcast service, such as SIRIUS XM RADIO, Inc. of New York, N.Y. In another example, data regarding air traffic congestion, high ice water content, turbulence, contrail mitigation, and the like may be transmitted via data-link or other communication method to the aircraft from ATC or the AOC. It will be appreciated that airborne constraint data 108 may be obtained from other sources beyond those described herein, including the FMS and/or other avionic systems of the aircraft, other ground sources, or other aircraft in the vicinity.

The comparative vertical situation display module 102 may display the comparative VSDs on the display unit 106 in conjunction with additional display information layers 110 displayed by other modules in the route planning system 100, the FMS, or other avionics systems of the aircraft. For example, the comparative VSDs may be displayed in conjunction with a horizontal or "plan-view" display showing the lateral components of the flight routes along with the airborne constraint data 108 described above. In one embodiment, the comparative vertical situation display module 102 may receive pilot inputs 112 from the flight crew of the aircraft or other route planning personnel that affect the display of the comparative VSDs on the display unit 106. The pilot inputs 112 may be received from an electronic flight information system ("EFIS") control panel, a display select panel ("DSP"), a multi-function control and display unit ("MCDU"), an EFB, or other input controls or data terminals. Pilot inputs 112 may include a selection of the specific display unit 106 in the cockpit on which to display the comparative VSDs, identification of the proposed flight routes to include in the display, the types of airborne constraint data 108 or other contextual data to include in the display, a range selection for the display, a mode selection for the display, a selection of symbology to be used for flight routes and airborne constraint data, and the like.

Figure 2:
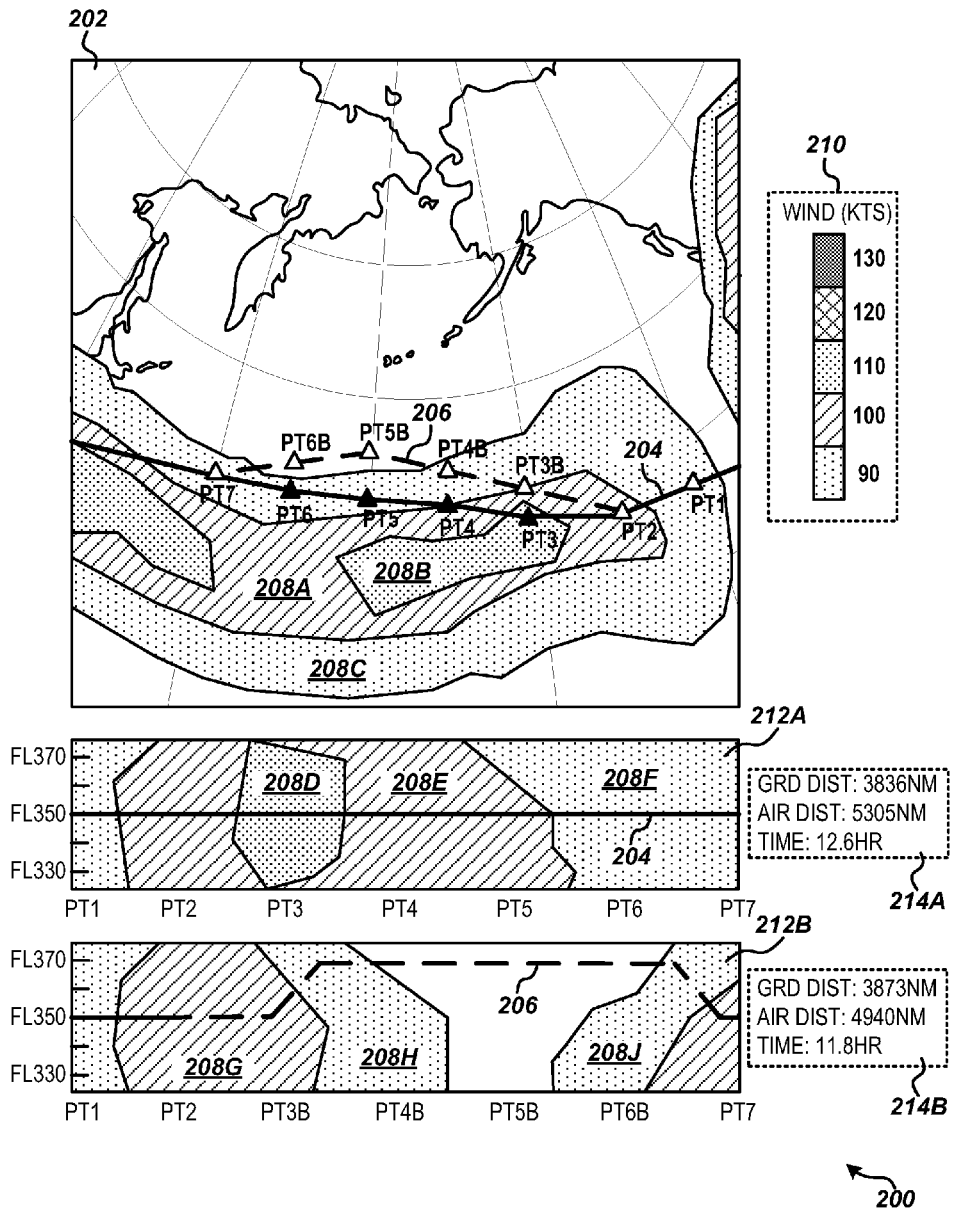
FIG. 2 is display diagram showing exemplary comparative vertical situation displays, according to embodiments presented herein.

FIG. 2 is a display diagram showing a comparative VSD display 200 as displayed on a display unit 106 accessible to the route planning system 100, such as the EFB display in the cockpit of the aircraft. According to one embodiment, the comparative VSD display 200 may be displayed in conjunction with a horizontal or plan-view display 202. The plan-view display 202 may include the currently active flight route of the aircraft, such as active route 204 shown in FIG. 2 as passing from navigation waypoint PT1 through PT2, PT3, PT4, PT5, PT6, and finally PT7. The plan-view display 202 may further show one or more alternate or proposed flight routes, such as proposed route 206 shown in the figure as passing from navigation waypoint PT1 through PT2, PT3B, PT4B, PT5B, PT6B, and finally PT7. The active route 204 and/or proposed route(s) 206 shown in the plan-view display 202 may be selectable by the flight crew or other route planning personnel through the pilot inputs 112 described above in regard to FIG. 1, for example.

The plan-view display 202 may also include indications of airborne constraints or other contextual data that may impact the active route 204 and/or proposed route(s) 206. Airborne constraints shown in the plan-view display 202 may include headwinds, tailwinds, turbulence, high ice water content, contrail mitigation or avoidance, volcanic ash, convective weather, air traffic congestion, icing potential, and the like. The airborne constraints and other contextual data may be shown as shaded contours, such as the contours 208A-208C (referred to herein generally as contours 208) shown in FIG. 2 indicating the affect of winds on the active route 204 and proposed route 206. In addition, a shading key 210 may indicate the relative impact of each contour 208 displayed.

It will be appreciated that other symbology may be additionally or alternatively shown in the plan-view display 202 to indicate the impact of airborne constraints including, but not limited to, wind barbs, vectors, point data, and polygons. In addition, multiple airborne constraints may be indicated in the plan-view display 202 by combining different types of symbology for distinct constraints. For example, headwinds/tailwinds may be indicated by wind barbs displayed in the plan-view display 202, while turbulence may be indicated by contours 208. The airborne constraint(s) to display and the type of symbology to utilize may be selectable by the flight crew or other route planning personnel through the pilot inputs 112 described above in regard to FIG. 1, for example.

According to embodiments, the comparative VSD display 200 includes a VSD 212A, 212B (referred to herein generally as VSD 212) corresponding to each of the flight routes shown in the plan-view display 202. For example, as shown in FIG. 2, the comparative VSD display 200 includes a first VSD 212A showing the active route 204 and second VSD 212B showing the proposed route 206. Each VSD 212 shows the vertical component, i.e. the flight level, of the corresponding flight route.

In one embodiment, the flight route is shown in each VSD 212 in a left-to-right orientation, as indicated by the navigation waypoints shown along the bottom of each VSD in FIG. 2. In alternative embodiments, the flight routes may be shown in the VSDs 212 in such a way as to visually correspond to the routes as shown in the plan-view display 202. In another embodiment, where the proposed route 206 overlaps the active route 204, such as between navigation waypoints PT1 and PT2 as shown in FIG. 2, the symbology, e.g. line type and/or color, for the active route may be shown in the VSD 212B corresponding to the proposed route in order to indicate that the routes are the same up to that point. The details required to display each flight route in a corresponding VSD 212 may be determined from the navigation/route information 104 received by the comparative vertical situation display module 102, as described above in regard to FIG. 1.

Each VSD 212 may further show the vertical components of the airborne constraints or other contextual data indicated in the plan-view display 202. The VSD 212 may utilize a similar symbology and shading for the display of the airborne constraints as utilized in the plan-view display 202. For example, as shown in FIG. 2, the first VSD 212A may contain shaded contours 208D-208F indicating the affect of winds on the vertical component of the active route 204, while the second VSD 212B may contain shaded contours 208G-208J indicating the affect of winds on the vertical component of the proposed route 206. In another embodiment, the VSDs 212 may utilize a different symbology or methodology for showing the vertical components of the airborne constraints along the displayed flight routes than those utilized in the plan-view display 202.

The depiction of the comparative VSD display 200 shown in FIG. 2 demonstrates the feasibility of the use of the comparative VSDs by the flight crew or other route planning personnel in evaluating the merits of a proposed route 206 in regard to a preferable or economical value of the flight. In this depiction, the headwind constraint impacting the active route 204, as shown in the first VSD 212A, is clearly greater than the headwind constraint impacting the proposed flight route 206, as shown in the second VSD 212B. Thus, using the proposed route 206 would result in an economical benefit to the flight in time and/or fuel consumption and emissions savings. It will be appreciated that situations may exist where the difference between the impacts of airborne constraints on the various flight routes may only be apparent in the comparative VSD display 200, and not in the corresponding plan-view display 202. This may be the case where the difference between the active route 204 and/or proposed route(s) 206 consists only in the vertical components, i.e. flight level.

According to a further embodiment, the comparative VSD display 200 also includes textual summary information 214A, 214B (referred to herein generally as textual summary information 214) for each VSD 212 shown. The textual summary information 214 may include computed flight data, such as grid distance, air distance, and flight time, corresponding to the flight route shown in the VSD 212. It will be appreciated that the textual summary information 214 may additionally or alternatively include other computed flight data and information beyond that shown in FIG. 2, including, but not limited to, ETA, ETE, total fuel used, total cost, total emissions, ride comfort, and other business drivers regarding the flight route. The textual summary information 214 may further be utilized by the flight crew or other route planning personnel to evaluate the differences between and the merits of the active route 204 and/or the proposed route(s) 206.

Figure 3:
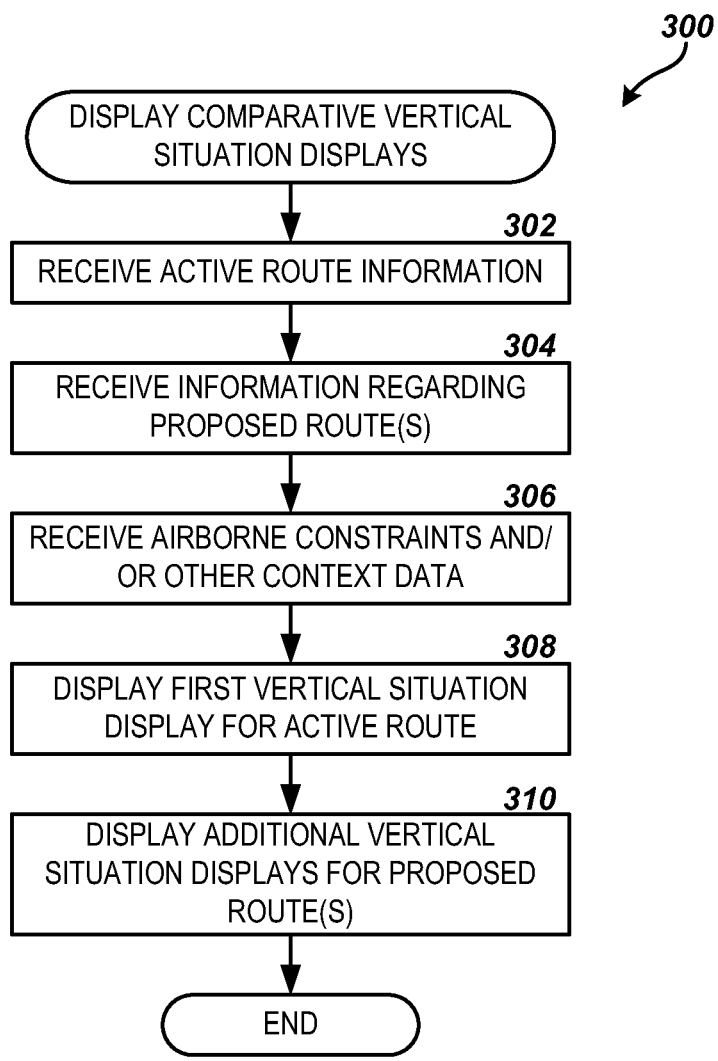
FIG. 3 is a flow diagram illustrating one method for displaying comparative vertical situation displays for two or more flight routes, as provided in the embodiments presented herein.

Turning now to FIG. 3, additional details will be provided regarding embodiments presented herein for providing comparative vertical situation displays of multiple routes. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 3 shows a routine 300 for displaying a comparative VSD display 200, such as that shown in FIG. 2 and described above, on a display unit 106. In one embodiment, the routine 300 is performed by the comparative vertical situation display module 102 described above in regard to FIG. 1. It will be appreciated that the routine 300 may also be performed by another module or component of the route planning system 100, or by any combination of modules and components.

The routine 300 begins at operation 302, where the comparative vertical situation display module 102 receives information regarding the currently active flight route. According to embodiments, the comparative vertical situation display module 102 may obtain this information from the navigation/route information 104 received from the FMS of the aircraft, data-linked from the AOC or ANSP, or directly entered into the route planning system 100 by the flight crew or other route planning personnel. It will be appreciated that, in situations where the comparative VSD display 200 is being utilized in conjunction with pre-flight planning and not en route, the currently active route may represent a currently selected or assigned primary route for the flight.

From operation 302, the routine 300 proceeds to operation 304, where the comparative vertical situation display module 102 receives information regarding one or more alternate or proposed flight routes. As described above, the comparative vertical situation display module 102 may obtain the information regarding the proposed route(s) from the navigation/route information 104 data-linked from the AOC. Alternatively, the flight crew or other route planning personnel may select the proposed route(s) from a number of pre-defined routes through a particular region, such as the North Atlantic Tracks published by U.S., Canadian, and European ANSPs. In a further example, the information regarding the proposed route(s) may be directly entered into the route planning system 100 by the flight crew or other route planning personnel.

The routine 300 proceeds from operation 304 to operation 306, where the comparative vertical situation display module 102 receives the airborne constraint data 108 and/or other context data to be displayed in the comparative VSDs 212. As described above in regard to FIG. 1, the airborne constraint data 108 may include data regarding headwinds, tailwinds, turbulence, high ice water content, contrail mitigation or avoidance, volcanic ash, convective weather, air traffic congestion, icing potential, and the like. The comparative vertical situation display module 102 may receive the airborne constraint data 108 from a variety of sources, including real-time weather broadcast services, ATC or AOC data-links, the FMS and/or other avionic systems of the aircraft, other aircraft in the vicinity, and the like.

From operation 306, the routine 300 proceeds to operation 308, where the comparative vertical situation display module 102 utilizes the information regarding the currently active flight route and the airborne constraint data 108 and/or other context data to display the first VSD 212A corresponding to the active route 204 on the display unit 106 in the manner described above in regard to FIG. 2. The comparative vertical situation display module 102 may determine the symbology and parameters for displaying the active route 204 and the airborne constraints based upon the pilot inputs 112 and/or other configuration settings in the route planning system 100. In addition, the comparative vertical situation display module 102 may compute the textual summary information 214A to display in conjunction with the first VSD 212. Next, the routine 300 proceeds to operation 310, where the comparative vertical situation display module 102 displays an additional VSD 212B corresponding to each specified or selected proposed route 206, in a manner similar to that described above. From operation 310, the routine 300 ends.

Figure 4:
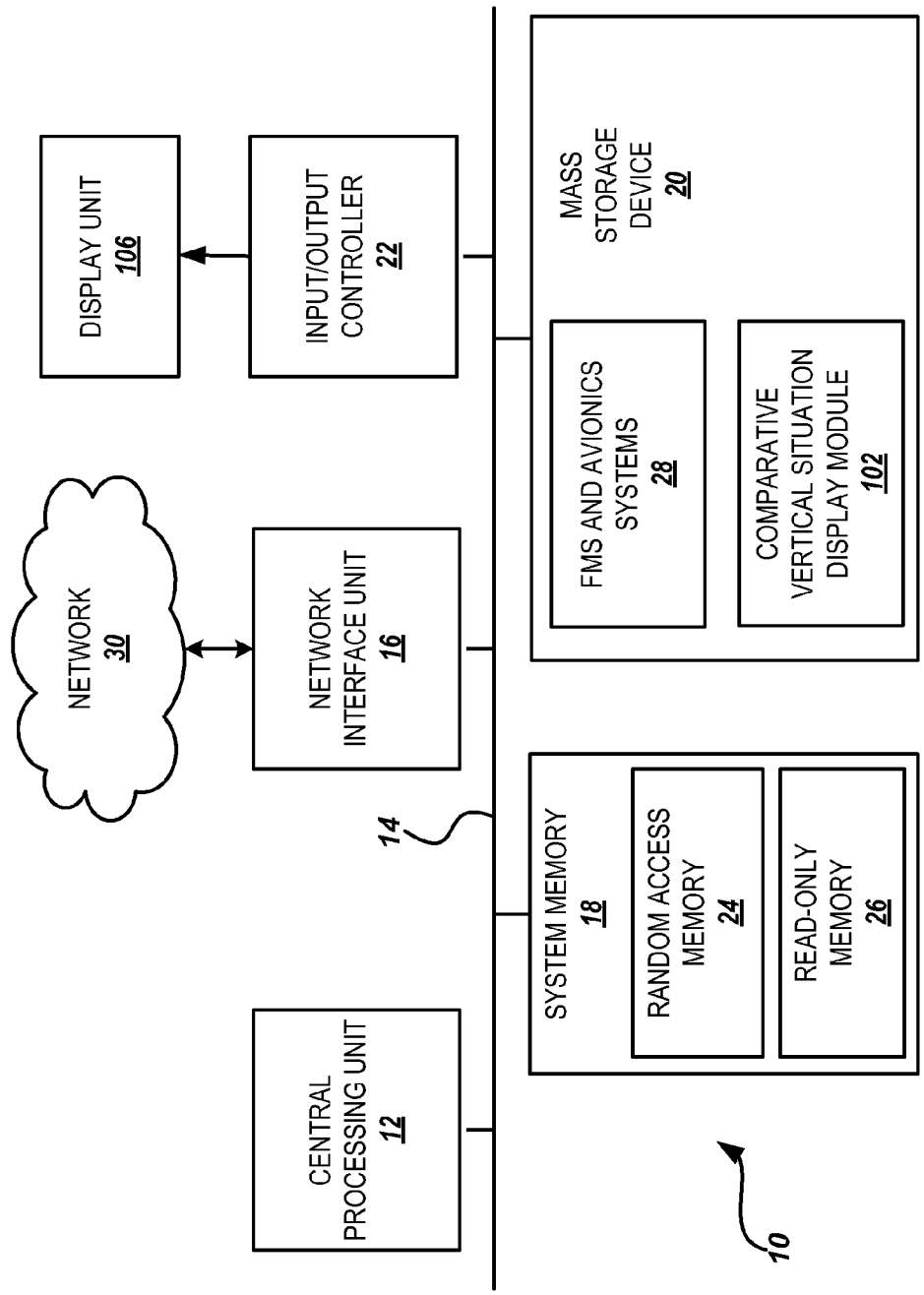
FIG. 4 is a block diagram showing an illustrative computer hardware and software architecture for a computing system capable of implementing aspects of the embodiments presented herein.

FIG. 4 shows an illustrative computer architecture 10 capable of executing the software components described herein for providing comparative vertical situation displays of multiple flight routes, in the manner presented above. The computer architecture 10 may be embodied in single computing device or in a combination of one or more processing units, storage units, and/or other computing devices implemented in the avionics systems of an aircraft, in ground-based computer systems, or a combination of the two. The computer architecture 10 includes one or more central processing units 12 ("CPUs"), a system memory 18, including a random access memory 24 ("RAM") and a read-only memory 26 ("ROM"), and a system bus 14 that couples the memory to the CPUs 12.

The CPUs 12 may be standard programmable processors that perform arithmetic and logical operations necessary for the operation of the computer architecture 10. The CPUs 12 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 10 also includes a mass storage device 20. The mass storage device 20 may be connected to the CPUs 12 through a mass storage controller (not shown) further connected to the bus 14. The mass storage device 20 and its associated computer-readable media provide non-volatile, non-transitory storage for the computer architecture 10. The mass storage device 20 may store an FMS and other avionics systems 28, as well as specific application modules or other program modules, such as the comparative vertical situation display module 102 described above in regard to FIG. 1. The mass storage device 20 may also store data collected or utilized by the various systems and modules.

The computer architecture 10 may store programs and data on the mass storage device 20 by transforming the physical state of the mass storage device to reflect the information being stored. The specific transformation of physical state may depend on various factors, in different implementations of this disclosure. Examples of such factors may include, but are not limited to, the technology used to implement the mass storage device 20, whether the mass storage device is characterized as primary or secondary storage, and the like. For example, the computer architecture 10 may store information to the mass storage device 20 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 10 may further read information from the mass storage device 20 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 10. By way of example, and not limitation, computer-readable media may include volatile and non-volatile, removable and non-removable media implemented in any method or technology for the non-transitory storage of information, such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer architecture 10. According to one embodiment, the computer 10 may have access to computer-readable media storing computer-executable instructions that, when executed by the computer, perform the routine 300 for displaying comparative vertical situation displays for two or more flight routes, as described above in regard to FIG. 3.

According to various embodiments, the computer architecture 10 may operate in a networked environment using logical connections to other avionics in the aircraft through a network, such as the network 30. The computer architecture 10 may connect to the network 30 through a network interface unit 16 connected to the bus 14. It should be appreciated that the network interface unit 16 may also be utilized to connect to other types of networks and remote computer systems. The computer architecture 10 may also include an input-output controller 22 for providing output to aircraft terminals and displays, such as the display unit 106 described above in regard to FIG. 1. Similarly, the input-output controller 22 may provide output to other displays, such as a computer monitor, a printer, or other type of output device. The input-output controller 22 may further receive input from devices, such as an MCDU, an EFIS control panel, a DSP, a keyboard, mouse, electronic stylus, or touch screen associated with the display unit 106, and the like.

Based on the foregoing, it should be appreciated that technologies for providing comparative vertical situation displays of multiple flight routes are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing comparative vertical situation displays ("VSDs") for a plurality of flight routes, the method comprising performing instructions under the control of one or more computer systems to perform the operations of:
   receiving information regarding the plurality of flight routes; and
   concurrently displaying a plurality of VSDs separately on a display unit, wherein a first VSD of the plurality of VSDs corresponds to a vertical component of an active flight route of an aircraft according to information received from a flight management system of the aircraft, and wherein a second VSD of the plurality of VSDs corresponds to a vertical component of a proposed alternate flight route for the aircraft according to information received from a flight crew of the aircraft, and wherein each of the VSDs further shows vertical components of one or more airborne constraints along the corresponding flight route.

2. The method of claim 1, wherein the display unit comprises a display unit in a cockpit of the aircraft.

3. The method of claim 1, wherein the plurality of VSDs are displayed in conjunction with a plan-view display showing lateral components of each of the plurality of flight routes.

4. The method of claim 1, further comprising displaying textual summary information for each of the plurality of VSDs, where the textual summary information comprises computed flight data for the flight route corresponding to the VSD.

5. The method of claim 1, wherein the one or more airborne constraints comprises one or more of headwinds, tailwinds, turbulence, high ice water content, contrail conditions, volcanic ash, convective weather, air traffic congestion, or icing potential.

6. The method of claim 1, wherein the vertical components of the one or more airborne constraints are shown as shaded contours in the VSD.

7. A system for providing comparative vertical situation displays ("VSDs") for a plurality of flight routes of an aircraft, the system comprising:
   a display unit in a cockpit of the aircraft;
   a memory for storing a program containing computer-executable instructions for displaying VSDs on the display unit; and
   a processing unit functionally coupled to the memory and the display unit, the processing unit being responsive to the computer-executable instructions and configured to:
      receive information regarding an active flight route of the aircraft from a flight management system of the aircraft;
      receive information regarding a proposed flight route for the aircraft from a flight crew of the aircraft; and
      concurrently display a first VSD corresponding to the active flight route and a second VSD corresponding to the proposed flight route on the display unit, wherein the first VSD shows a vertical component of the active flight route, and the second VSD shows a vertical component of the proposed flight route.

8. The system of claim 7, wherein the first VSD further shows vertical components of one or more airborne constraints along the active flight route, and the second VSD further shows the vertical components of the one or more airborne constraints along the proposed flight route.

9. The system of claim 8, wherein the one or more airborne constraints comprises one or more of headwinds, tailwinds, turbulence, high ice water content, contrail conditions, volcanic ash, convective weather, air traffic congestion, or icing potential.

10. The system of claim 8, wherein the vertical components of the one or more airborne constraints are shown as shaded contours in the first VSD and the second VSD.

11. The system of claim 7, wherein the first VSD and the second VSD are displayed on the display unit in conjunction with a plan-view display showing lateral components of each of the active flight route and the proposed flight route.

12. The system of claim 7, wherein the processing unit is further configured to display textual summary information for each of the first VSD and the second VSD, wherein the textual summary information comprises computed flight data for the flight route corresponding to the VSD.

13. A non-transitory computer-readable medium comprising computer-executable instructions that, when executed by a computer, cause the computer to:
   receive information regarding an active flight route of the aircraft from a flight management system of the aircraft;
   receive information regarding a proposed flight route of the aircraft from a flight crew of the aircraft; and
   concurrently display a plurality of vertical situation displays ("VSDs") separately, wherein a first VSD of the plurality of VSDs corresponds to the active flight route, wherein a second VSD of the plurality of VSDs corresponds to the proposed flight route, wherein each of the VSDs shows a vertical component of the corresponding flight route, and wherein each of the VSDs further shows vertical components of one or more airborne constraints along the corresponding flight route.

14. The non-transitory computer-readable medium of claim 13, wherein the plurality of VSDs are displayed in conjunction with a plan-view display showing lateral components of each of the plurality of flight routes.

15. The non-transitory computer-readable medium of claim 13, comprising further computer-executable instructions that cause the computer to display textual summary information for each of the plurality of VSDs, where the textual summary information comprises computed flight data for the flight route corresponding to the VSD.

* * * * *